(12) United States Patent
Ring et al.

(10) Patent No.: US 7,467,812 B2
(45) Date of Patent: Dec. 23, 2008

(54) BRAKE HOSE LIFTING APPARATUS

(75) Inventors: Michael E. Ring, Saint John, IN (US); Howard Sommerfeld, Oak Forest, IL (US); Scott Natschke, Kankakee, IL (US)

(73) Assignee: WABTEC Holding Corp., Wilmerding, PA (US)

( * ) Notice: Subject to any disclaimer, the term of this patent is extended or adjusted under 35 U.S.C. 154(b) by 461 days.

(21) Appl. No.: 11/045,644

(22) Filed: Jan. 28, 2005

(65) Prior Publication Data

US 2005/0173920 A1    Aug. 11, 2005

Related U.S. Application Data

(60) Provisional application No. 60/544,014, filed on Feb. 11, 2004.

(51) Int. Cl.
*F16L 35/00* (2006.01)

(52) U.S. Cl. .......... 285/25; 137/349; 141/279; 248/53; 213/76

(58) Field of Classification Search .......... 285/24, 285/25, 26, 28, 29; 137/349, 347; 141/279, 141/382; 248/53, 327; 213/76
See application file for complete search history.

(56) References Cited

U.S. PATENT DOCUMENTS

| | | | | |
|---|---|---|---|---|
| 988,206 A * | 3/1911 | Moss et al. | .......... | 248/53 |
| 1,590,537 A * | 6/1926 | Merryweather | .......... | 213/76 |
| 3,658,231 A * | 4/1972 | Gilman | .......... | 228/44.5 |
| 3,784,030 A * | 1/1974 | Chierici | .......... | 213/76 |
| 4,986,500 A * | 1/1991 | Campbell | .......... | 248/53 |
| 6,253,786 B1 * | 7/2001 | Maa | .......... | 137/349 |
| 7,070,062 B2 * | 7/2006 | Trescott | .......... | 213/75 R |
| 7,267,306 B2 * | 9/2007 | Eason et al. | .......... | 248/53 |

* cited by examiner

*Primary Examiner*—David E Bochna
(74) *Attorney, Agent, or Firm*—James Ray & Assoc.

(57) ABSTRACT

An apparatus for lifting a brake hose including a glad hand secured to one end thereof. The brake hose to be lifted into an elevated position is attached to an end of a railway car. Such apparatus further maintains the brake hose in such elevated position during in track service. Such apparatus includes a first member engageable with a predetermined portion of such railway car and a second member engageable with one of such glad hand and such brake hose. There is at least one fluid pressure actuated expansion member disposed between and engageable with such first and second member. Additionally, a supply line having a choke is disposed in fluid communication with such at least one fluid pressure actuated expansion member and a source of fluid pressure for expanding the expansion member in a longitudinal direction and thereby raise such brake hoses to a predetermined elevated position.

9 Claims, 2 Drawing Sheets

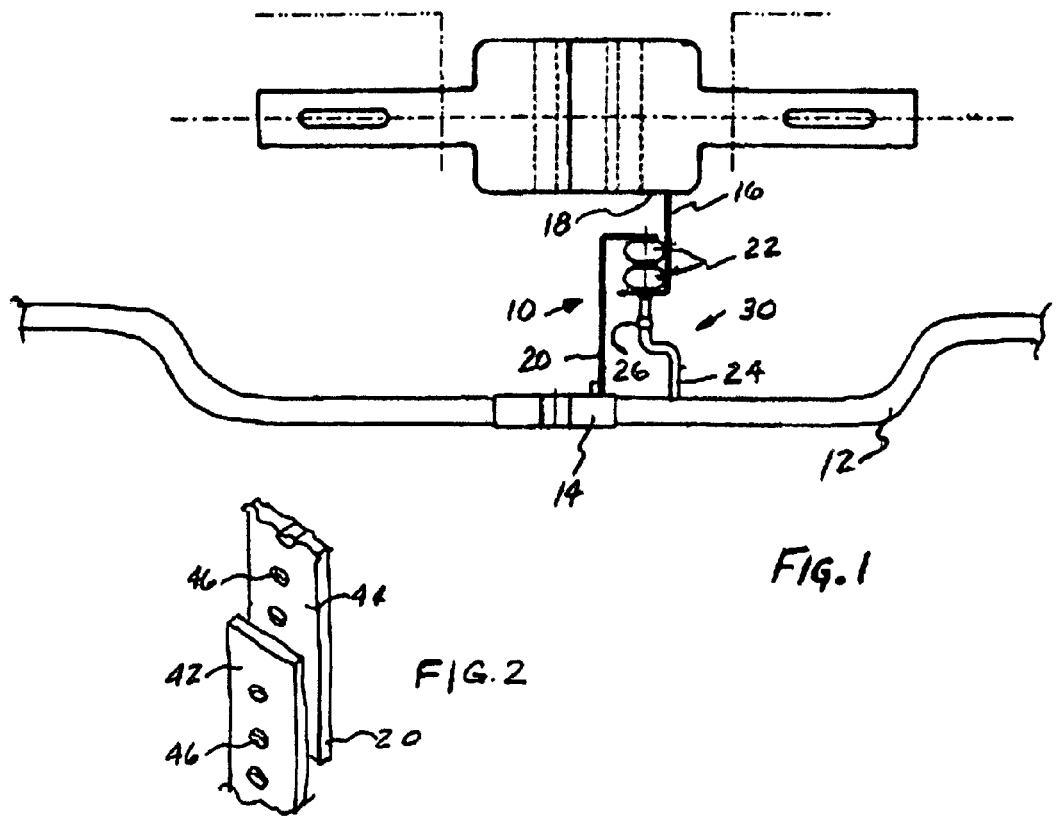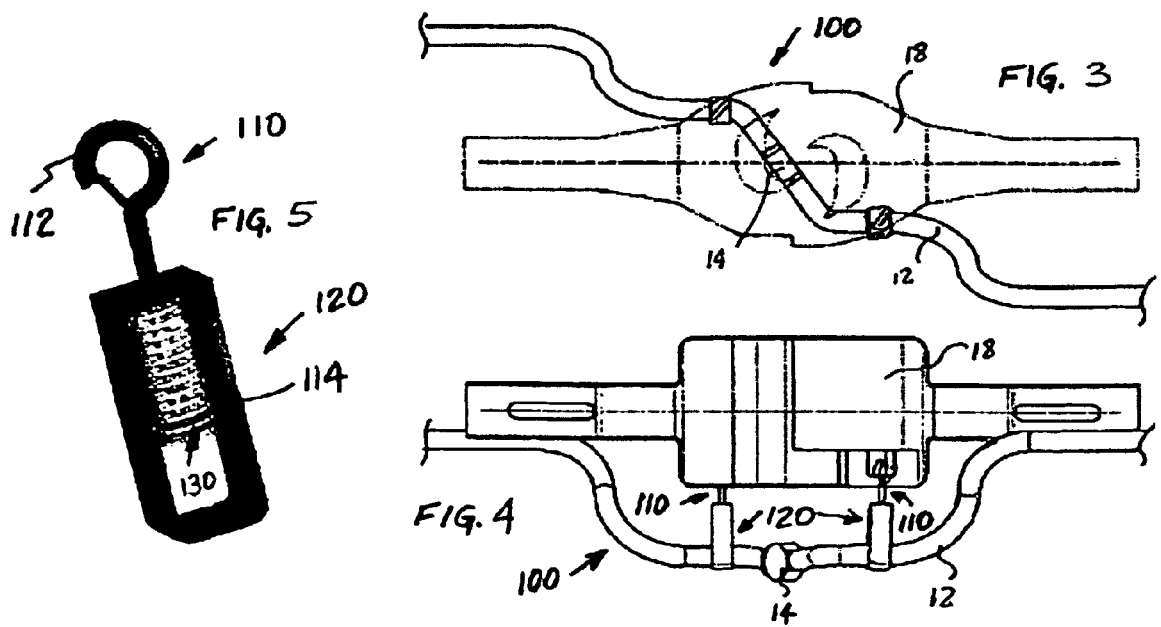

BRAKE HOSE LIFTING APPARATUS

CROSS-REFERENCE TO RELATED APPLICATIONS

This application is related to and claims priority from U.S. Provisional Patent Application Ser. No. 60/544,014 filed on Feb. 11, 2004.

FIELD OF THE INVENTION

The present invention relates, in general, to railway vehicle brake hoses and, more particularly, this invention relates to an apparatus for both lifting and maintaining such brake hoses in an elevated position which position is at least sufficient to insure that the brake hoses will not be accidentally damaged during in track service of such railway vehicle.

BACKGROUND OF THE INVENTION

As is generally well known in the railway industry, the brake hoses of adjacently disposed railway cars are joined together in an air tight manner by glad hands for the purpose of supplying compressed air to the brake system.

Prior to the conception and development of the present invention, as is equally well known in the railway industry, the vertical elevation of these brake hoses after being joined together at the gland hands is prone to misalignments thereby allowing the brake hoses to hang down freely towards the ground. Currently, it has been determined that a number of railroads are experiencing difficulty in maintaining these brake hoses together at least partially due to aging and stretching of the elastomer straps generally used for suspending the glad hand joint from the coupler of the railway vehicle as taught, for example, by the U.S. Pat. No. 4,986,500 to Campbell.

Brake hose supports of a cable type taught by U.S. Pat. No. 5,794,894 to Fremund and U.S. Pat. No. 4,519,564 to Nadherny have not adequately resolved maintenance difficulties.

Should a brake hose become accidentally uncoupled, cut and/or broken for any reason this will result in the brakes being applied to the train. This is obviously an undesirable and, most likely, costly condition, but one which is necessary for the safety of the workers and equipment. The connection between these brake hoses can be broken or the brake hoses themselves may be broken and/or slashed, for example, if they catch on, or are struck by, something sharp that is both tall enough and laying between the rails.

SUMMARY OF THE INVENTION

In a first aspect, the present invention provides an apparatus for lifting a brake hose including a glad hand secured to one end thereof. Such brake hose to be lifted into an elevated position being attached to an end of a railway car. The apparatus further maintains such brake hose in such elevated position during in track service. The apparatus includes a first member engageable with a predetermined portion of such railway car. A second member is engageable with at least one of such glad hand and such brake hose. There is at least one fluid pressure actuated expansion member disposed between and engageable with such first member and such second member. Further a means is disposed in fluid communication with the at least one fluid pressure actuated expansion member and a source of fluid pressure for expanding such expansion member in a longitudinal direction thereby raising such brake hoses to a predetermined elevated position.

According to an alternative embodiment, the apparatus includes, like the first embodiment, a first member engageable with a predetermined portion of such railway car. A second member, also like the first embodiment, is engageable with one of such glad hand and such brake hose. In this embodiment there is a biasing means caged between at least a portion of such first member and at least a portion of the second member for lifting and maintaining such brake hoses in such elevated position.

In yet another alternative embodiment of the invention, the apparatus includes, like the other embodiments, both the first member which is engageable with a predetermined portion of such railway car and the second member which is engageable with one of such glad hand and such brake hose. In this embodiment, there is an air muscle engaged at a first end thereof to such first member and engaged at a second end thereof to such second member. A fluid communication means is connected for fluid communication between a source of fluid pressure and the air muscle for causing such air muscle to expand and thereby elevate such brake hose to a desired height.

In a further alternative embodiment of the invention, the apparatus includes, like the other embodiments, both the first member which is engageable with a predetermined portion of such railway car and the second member which is engageable with one of such glad hand and such brake hose. In this embodiment, there is an elastic member manufactured from a material having a thermal shape memory, such as nitinol. The elastic member is engaged at a first end thereof to such first member and engaged at a second end thereof to such second member. A preferred shape of such elastic member is round. An electrical communication means is connected for electrical communication between a source of electric energy and the elastic means for causing such elastic means to contract in a longitudinal direction upon supply of the electric energy and thereby elevate such brake hose to a desired height.

In yet further alternative embodiment of the invention, the apparatus includes such first and second members ends formed in a hook or a loop like manner with either a spring, air muscle or thermal shape memory member integrally disposed therebetween.

OBJECTS OF THE INVENTION

It is, therefore, one of the primary objects of the present invention to provide a brake hose lifting apparatus which will both lift and maintain the brake hose disposed at each end of a railway car up to and at, respectively, a distance at least sufficient to substantially minimize such brake hose coming into contact with some obstruction which will damage and/or break the hose.

Another object of the present invention is to provide a railway vehicle brake hose lifting apparatus which can be both easily and readily retrofitted onto existing brake equipment.

Still another object of the present invention is to provide a railway vehicle brake hose lifting apparatus which is relative inexpensive to produce.

Yet another object of the present invention is to provide a railway vehicle brake hose lifting apparatus which is relatively easy to install.

A further object of the present invention is to provide a railway vehicle brake hose lifting apparatus which requires a minimum amount of maintenance.

Yet a further object of the present invention is to provide a railway vehicle brake hose lifting apparatus which will substantially minimize detrimental brake applications due to broken brake hoses which will allow a loss of air in the brake pipe.

An additional object of the present invention is to provide a railway vehicle brake hose lifting apparatus which will include a manual release which is easy to operate and maintain in order to facilitate a recoupling operation of the brake hoses.

In addition to the several objects and advantages of the present invention which have been described with some degree of specificity above, various other objects and advantages of the invention will become more readily apparent to those persons who are skilled in the railway braking art from the following more detailed description of such railway vehicle brake hose lifting apparatus, particularly, when such description is taken in conjunction with the attached drawing Figures and with the appended claims.

BRIEF DESCRIPTION OF THE DRAWINGS

FIG. 1 is a side elevation schematic illustration of one form of one embodiment of a railway vehicle brake hose lifting apparatus which employs the use of an air bag arrangement;

FIG. 2 is a partial perspective view of the brake hose lifting apparatus of FIG. 1, particularly showing an adjustable support member;

FIG. 3 is a schematic plan view of another embodiment of a railway vehicle brake hose lifting apparatus which utilizes a spring loaded carrier;

FIG. 4 is a schematic side elevation view of the railway vehicle brake hose lifting apparatus utilizing a spring loaded carrier as illustrated in FIG. 3;

FIG. 5 is a perspective view of a presently preferred embodiment of a spring loaded carrier for use in the railway vehicle brake hose lifting apparatus illustrated in FIGS. 3-4;

BRIEF DESCRIPTION OF THE VARIOUS EMBODIMENTS OF THE PRESENT INVENTION

Figure 6:
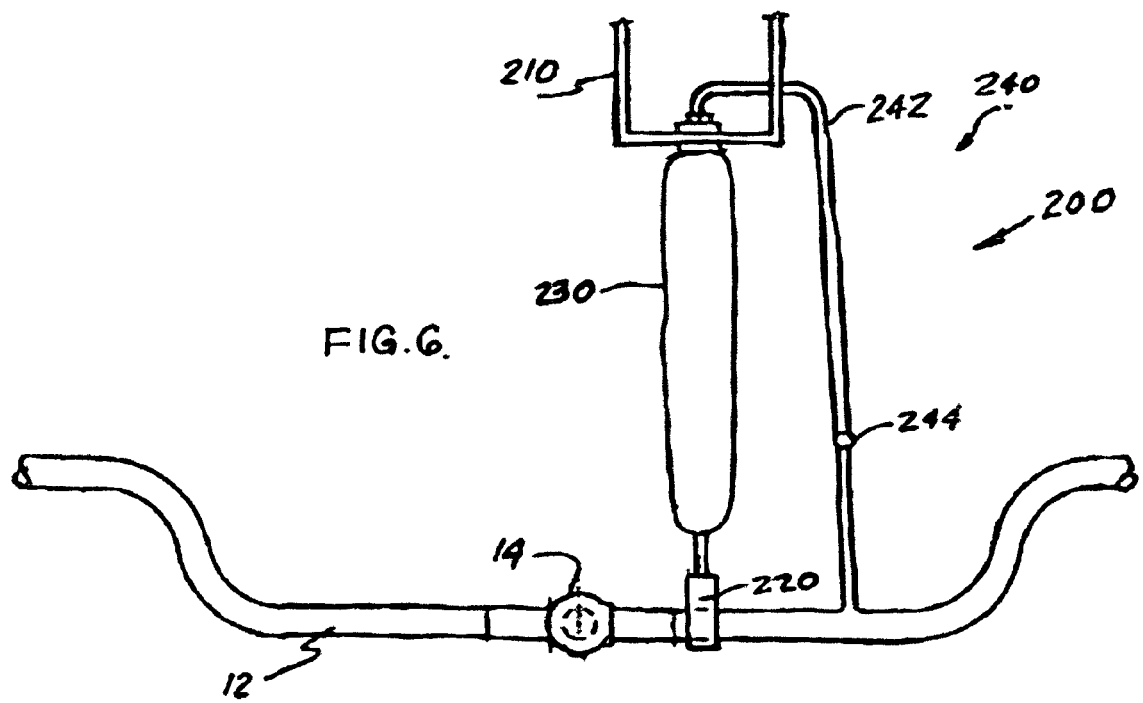
FIG. 6 is a schematic side elevation view of still another embodiment of a railway vehicle brake hose lifting apparatus which utilizes an air muscle for lifting the brake hoses into position.

Prior to proceeding to the more detailed description of the present invention, it should be noted that, for the sake of clarity and understanding, identical components which have identical functions have been identified with identical reference numerals throughout the several views illustrated in the drawing figures.

Reference is now made, more particularly, to FIGS. 1 and 2. Illustrated therein is one form of an apparatus, generally designated 10, for lifting a brake hose 12. Such brake hose 12 includes a glad hand 14 secured to one end thereof. The brake hose 12 to be lifted into an elevated position is attached to an end of a railway car (not shown). The apparatus 10 further maintains such brake hose 12 in such elevated position during in track service.

In this embodiment, the apparatus 10 includes a first, preferably rigid, member 16 engageable at one end, preferably in a pivotal manner, with a predetermined portion of such railway car (not shown) which is preferably a coupler 18. This first member 16 may be in the form of a reverse L shaped member.

There is a second, preferably rigid, member 20 engageable at one end with one of such glad hand 14 and such brake hose 12. This second member 20 may be in the form of an inverted L shaped member.

Also provided is at least one fluid pressure actuated expansion member 22. Such at least one fluid pressure actuated expansion member 22 is disposed between and engageable with such first member 16 and second member 20. Such at least one fluid pressure actuated expansion member 22 may be a well known pneumatic cylinder (not shown) having a piston rod (not shown) connected to the second member 20, at least one air bladder or at least one inflatable air cell. Preferably, such at least one fluid pressure actuated expansion member 22 is at least one air bag.

According to this embodiment, there is a means, generally designated 30, in fluid communication with such at least one fluid pressure actuated expansion member 22 and a source of fluid pressure for upwardly expanding the expansion member 22 in a longitudinal direction thereby moving the second member 20 and raising such brake hoses 12 to a predetermined elevated position. The source of fluid pressure may be, for example, the brake hose 12 or some other external source. If the brake hose 12 is used as the source of fluid pressure, the means 30 will include a supply line 24 having a choke 26 disposed therein connected between the brake hose 12 and the at least one fluid pressure actuated expansion member 22. Preferably, such choke 26 is manually operable for selectively supplying and discharging such fluid pressure.

The apparatus 10 may be further adapted with a means 40 for manually adjusting such predetermined elevated position of the brake hose 12. In such embodiment, the second member 20 may be, for example, comprised of a first and second portions 42 and 44 respectively joined together intermediate the ends of such second member 20 and including a predetermined plurality of complimentary apertures 46 disposed at a predetermined distance within each first and second portions 42 and 44 respectively with at least a pair of such complimentary apertures 46 aligned to accept a fastening means (not shown), as best shown in FIG. 2, for adjusting a predetermined distance between such ends of the second member 20.

It will be appreciated that pivotal engagement of the apparatus 10 with the coupler 18 provides for flexibility of the brake hose 12 and glad hand 14 as the railway car (not shown) negotiates a turn.

Attention is now directed to FIGS. 3-5, wherein there is illustrated another embodiment of an apparatus, generally designated 100, for lifting a brake hose 12 including a glad hand 14 secured to one end thereof.

In this embodiment, such apparatus 100 includes a first member, generally designated 110, engageable at a first end thereof with a predetermined portion of such railway car (not shown). Such first member 110 includes a hook or a loop like member 112 for pivotal engagement at a first end thereof with such predetermined portion of such railway car (not shown) which is preferably the coupler 18. Such hook or loop like member 112 will be particularly advantageous for connection to a well known eyelet lug (not shown) of the glad hand 14 or an eyelet lug (not shown) of the coupler 18.

A second member, generally designated 120, is engageable at a first end thereof with a portion of such first member 110 disposed intermediate each end of such first member 110. The second end of such second member 120 is engageable with one of such glad hand 14 and such brake hose 12.

A biasing means, generally designated 130, is engageable with and, preferably caged between, at least a portion of such first member 110 and at least a portion of the second member 120 for lifting and maintaining such brake hoses 12 in such elevated position. Preferably, such biasing means is a compression spring 114 having a predetermined spring rate. Advantageously, the brake hose 12 is also caged within the second member 120.

It will be appreciated that an extension spring 114 may be utilized in place of the fluid pressure actuated expansion member 22 in FIG. 1.

Alternatively, a compression spring 114 having a predetermined spring rate and further having the hook or the loop like portion 112 at each end thereof may be utilized for directly engaging the coupler 18 at one end and one of such glad hand 14 and such brake hose 12 at the other end for lifting and maintaining such brake hoses 12 in such elevated position.

It will be understood that such spring 114 may be manually stretched to engage one of such glad hand 14 and such brake hose 12 and then released to elevate such brake hose 12 to a predetermined position. Thus, a person manually stretching such spring 114 will be the source of energy causing such spring 114 to contract.

Refer now to FIG. 6. Shown therein is still yet another embodiment of an apparatus, generally designated 200, for lifting a brake hose 12 having a glad hand 14 secured to one end thereof into an elevated position. Such brake hose being attached to an end of a railway car (not shown). Such apparatus 200 further maintaining such brake hose 12 in such elevated position during in track service.

The apparatus in this embodiment includes a first member, preferably a bracket 210, which is engageable with a predetermined portion of such railway car (not shown) which is preferably the coupler 18.

A second member 220 is engageable with one of such glad hand 14 and such brake hose 16.

There is an air muscle 230 engaged at a first end thereof to such first member 210 and engaged at a second end thereof to said second member 220.

A fluid communication means, generally designated 240, is connected for fluid communication between a source of fluid pressure and such air muscle 230 for causing the air muscle 230 to contract in a longitudinal direction with application of such fluid pressure and thereby elevate such brake hose 12 to a desired height. If the brake hose 12 is used as the source of fluid pressure, the means 240 will include a supply line 242 having a choke 244 disposed therein connected between the brake hose 12 and the air muscle 230.

Advantageously, such air muscle 230 is self-dampening during contraction and its flexible material construction cushions downward movement of the brake hose 12 during extension in such longitudinal direction.

It will be understood that the hook like portion 112 may be integrally connected to each end of the air muscle 230 for engaging the coupler 18 at one end and one of such glad hand 14 and such brake hose 12 at the other end.

Figure 7:
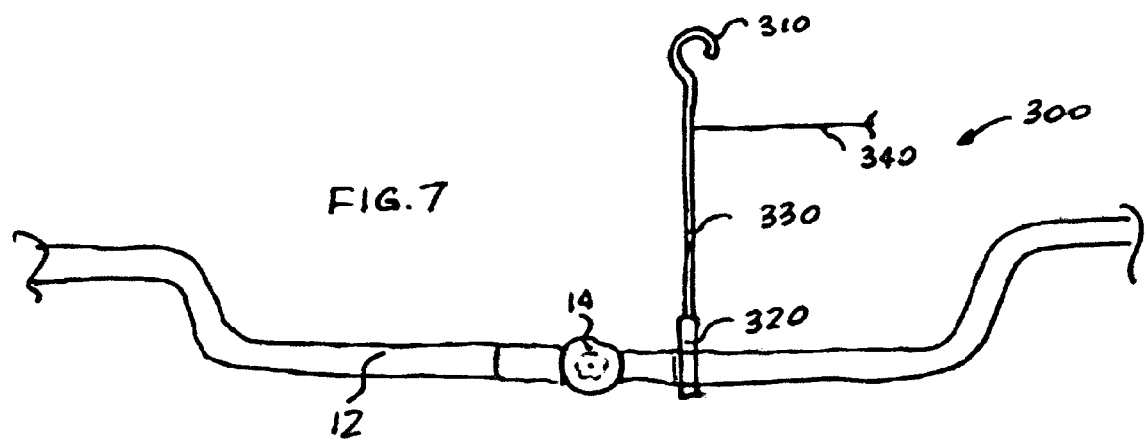
FIG. 7 is a schematic side elevation view of a further embodiment of a railway vehicle brake hose lifting apparatus which utilizes an alloy material having a thermal shape memory for lifting the brake hoses into position.

A further embodiment of an apparatus, generally designated 300, for lifting a brake hose 12 having a glad hand 14 secured to one end thereof into an elevated position is shown in FIG. 7. Such brake hose 12 being attached to an end of a railway car (not shown). Such apparatus 300 further maintains such brake hose 12 in such elevated position during in track service.

The apparatus in this embodiment includes a first member 310 which is engageable with a predetermined portion of such railway car (not shown) which is preferably the coupler 18.

A second member 320 is engageable with one of such glad hand 14 and such brake hose 16.

A member 330 manufactured from an elastic alloy material having a thermal shape memory, such as nitinol, is engaged at a first end thereof to such first member 310 and engaged at a second end thereof to said second member 320. Such member 330 has an electrical connection 340 with an energy source (not shown), which is either a DC or AC electrical energy source. Such member 330 has a predetermined shape and a predetermined size. The preferred predetermined shape of such member 330 is round. A preferred shape of first and second members 310 and 320 respectively is a hook or a loop. It is further preferred that such first and second members 310 and 320 respectively are formed integral to the thermal shape memory member 330.

As it well known, such nitinol material will shorten in length when electrically powered and thereby lift such brake hose 12 to a predetermined elevated position.

It will be appreciated that embodiments of FIGS. 1-7 and, particularly the air muscle of FIG. 6, provide an inexpensive and relatively easy to install apparatus for lifting the brake hose 12 to such desired height and maintaining such brake hose 12 in such elevated position during in track service. Furthermore, such apparatus requires minimal amount of maintenance.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

We claim:

1. An apparatus for lifting a brake hose including a glad hand secured to one end thereof, such brake hose to be lifted into a predetermined elevated position being attached to an end of a railway car, said apparatus further maintaining such brake hose in such predetermined elevated position during in track service, said apparatus comprising:
    (a) a first elongated member positioned in a vertical direction and having a first end thereof connected to a predetermined portion of such railway car;
    (b) a second elongated member positioned in a vertical direction and having a first end thereof connected to one of such glad hand and such brake hose;
    (c) at least one fluid pressure actuated expansion member disposed between said first elongated member and said second elongated member;
    (d) an attachment means for attaching said at least one fluid pressure actuated expansion member to an opposed second end of each of said first elongated member and said second elongated member; and
    (e) a fluid communication means in fluid communication with said at least one fluid pressure actuated expansion member and a source of a fluid pressure for expanding said expansion member in a vertical direction upon supply of said fluid pressure thereby raising such brake hoses to such predetermined elevated position.

2. The apparatus according to claim 1, wherein said at least one fluid pressure actuated expansion member is at least one of a cylinder, bellow, bladder, air cell and air bag.

3. The apparatus according to claim 1, wherein said source of fluid pressure is such brake hose.

4. The apparatus according to claim 3, wherein said apparatus includes a supply line connected between such brake hose and said at least one fluid pressure actuated expansion member, said supply line having a choke disposed therein for selectively supplying and discharging said fluid pressure.

5. The apparatus according to claim 1, wherein said apparatus includes a means for manually adjusting said predetermined elevated position of such brake hose.

6. The apparatus according to claim 5, wherein said means for manually adjusting said predetermined elevated position of such brake hose includes said second elongated member having a first portion with a first predetermined plurality of apertures formed therethrough and a second portion with a second plurality of apertures formed therethrough, said first and second portions respectively joined together intermediate ends of said second elongated member, and wherein at least one of said first predetermined plurality of apertures is aligned with at least one of said second plurality of apertures to accept a fastener therethrough.

7. The apparatus according to claim 1, wherein said first end of said first elongated member is pivotally connected to a coupler of such railway car and said first end of said second elongated member is pivotally connected to one of such glad hand and such brake hose.

8. The apparatus according to claim 1, wherein said attachment means includes a first flange attached to said second end of said first elongated member and to one end of said at least one fluid pressure actuated expansion member and a second flange attached to said second end of said second elongated member and to an opposed end of said at least one fluid pressure actuated expansion member, said first and second flanges are disposed generally horizontally when said apparatus is installed for lifting such brake hose.

9. The apparatus according to claim 8, wherein each of said first and second elongated member has an L-shape.

* * * * *